US010761398B2

(12) United States Patent
Summers

(10) Patent No.: US 10,761,398 B2
(45) Date of Patent: Sep. 1, 2020

(54) IMAGING ELLIPSOMETER SYSTEM UTILIZING A TUNABLE ACOUSTIC GRADIENT LENS

(71) Applicant: Mitutoyo Corporation, Kanagawa-ken (JP)

(72) Inventor: Joseph Andrew Summers, Seattle, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 40 days.

(21) Appl. No.: 16/023,148

(22) Filed: Jun. 29, 2018

(65) Prior Publication Data

US 2020/0004103 A1 Jan. 2, 2020

(51) Int. Cl.
*G02F 1/29* (2006.01)
*G01N 21/21* (2006.01)
*G02F 1/33* (2006.01)

(52) U.S. Cl.
CPC .............. *G02F 1/29* (2013.01); *G01N 21/211* (2013.01); *G02F 1/33* (2013.01)

(58) Field of Classification Search
CPC ......... G01N 21/211; G02F 1/29; H04N 5/238
See application file for complete search history.

(56) References Cited

U.S. PATENT DOCUMENTS

| | | |
|---|---|---|
| 5,076,696 A | 12/1991 | Cohn et al. |
| 5,754,296 A | 5/1998 | Law |
| 7,627,162 B2 | 12/2009 | Blanford et al. |
| 8,194,307 B2 | 6/2012 | Arnold et al. |
| 9,143,674 B2 | 9/2015 | Gladnick |
| 9,213,175 B2 | 12/2015 | Arnold |
| 9,256,009 B2 | 2/2016 | Theriault et al. |
| 9,726,876 B2 | 8/2017 | Bryll |
| 9,736,355 B1* | 8/2017 | Bryll .................. G02B 21/0016 |

(Continued)

OTHER PUBLICATIONS

Sony Brings IMX250 Pregius CMOS Sensor with On-Pixel Polarizer for Improved Object Detection, https://www.framos.com/en/news/sony-brings-imx250-pregius-cmos-sensor-with-on-pixel-polarizer-for-improved-object-detection, Mar. 28, 2018 (Year: 2018).*

(Continued)

*Primary Examiner* — Violeta A Prieto
(74) *Attorney, Agent, or Firm* — Seed IP Law Group LLP

(57) ABSTRACT

A imaging ellipsometer system is provided including a lens configuration with tunable acoustic gradient index of refraction ("TAG") lens. The imaging ellipsometer system further includes a light source, a polarizer, a compensator, an analyzer and a camera. Light from the light source passes through the polarizer and is directed toward a workpiece. In various implementations, the compensator is located and configured to elliptically polarize the light either before or after the light is reflected from the workpiece. The lens configuration receives the reflected workpiece light and the TAG lens is controlled to provide a modulation of a focus position. The camera receives workpiece light that passes through the TAG lens and the analyzer during an image exposure and provides a corresponding camera image. An ellipsometry analysis is performed (e.g., to determine at least one of a refraction index, or a thickness of one or more layers of the workpiece, etc.)

20 Claims, 4 Drawing Sheets

(56) References Cited

U.S. PATENT DOCUMENTS

| | | |
|---|---|---|
| 9,774,765 B2 | 9/2017 | Bryll et al. |
| 9,830,694 B2 | 11/2017 | Bryll |
| 9,930,243 B2 | 3/2018 | Gladnick et al. |
| 10,101,572 B2 | 10/2018 | Bryll et al. |
| 10,151,962 B2 | 12/2018 | Gladnick et al. |
| 10,171,725 B1* | 1/2019 | Nahum ............ H04N 5/232123 |
| 10,281,700 B1* | 5/2019 | Nahum .................. G02B 27/10 |
| 10,520,650 B2* | 12/2019 | Freerksen ............ G02B 3/0087 |
| 2002/0093648 A1* | 7/2002 | Nikoonahad ........ G01N 21/211 356/237.1 |
| 2004/0235205 A1* | 11/2004 | Levy .................... G01N 21/211 438/14 |
| 2014/0368726 A1* | 12/2014 | Gladnick ............... G01B 11/24 348/349 |
| 2015/0145980 A1* | 5/2015 | Bryll .................... G02B 21/241 348/79 |
| 2015/0168290 A1* | 6/2015 | Shachaf .................. G02B 7/28 356/369 |
| 2017/0013185 A1* | 1/2017 | Gladnick ........... H04N 5/23296 |
| 2017/0061601 A1* | 3/2017 | Bryll .................... G06F 3/04842 |
| 2017/0078532 A1* | 3/2017 | Bryll ....................... H04N 9/045 |
| 2017/0078549 A1 | 3/2017 | Emtman et al. |
| 2017/0285318 A1* | 10/2017 | Cho ...................... G02B 21/025 |
| 2017/0318216 A1* | 11/2017 | Gladnick ............ G02B 21/367 |
| 2017/0324895 A1* | 11/2017 | Bryll .................... H04N 5/2353 |
| 2018/0088440 A1* | 3/2018 | Gladnick ........... H04N 5/23212 |
| 2018/0139390 A1* | 5/2018 | Gladnick ........... H04N 5/23216 |
| 2018/0143419 A1 | 5/2018 | Bryll et al. |
| 2018/0180773 A1 | 6/2018 | Usami et al. |

OTHER PUBLICATIONS

Accurion GmbH, "COMPENDIUM—Principles of Nulling and Imaging Ellipsometry," May 7, 2013, URL=https://www.accurion.com/imaging-ellipsometry/technology/principles-of-imaging-ellipsometry.pdf, download date Oct. 5, 2018, 4 pages.

Asinovski et al., "Imaging ellipsometry: quantitative analysis," *Phys. Stat. Sol.* 205(4):764-771, 2008.

Mermillod-Blondin et al., "High-speed varifocal imaging with a tunable acoustic gradient index of refraction lens," *Optics Letters* 33(18):2146-2148, 2008.

Flir Integrated Imaging Solutions, Inc., "Imaging Reflective Surfaces: Sony's first Polarized Sensor," Url=https://www.ptgrey.com/sony-polarization, download date Jun. 21, 2018, 10 pp.

Lucid Vision Labs Inc., "Beyond Conventional Imaging: Sony's Polarized Sensor," URL=https://thinklucid.com/tech-briefs/polarization-explained-sony-polarized-sensor/, download date May 29, 2018, 11 pages.

Nanofilm Technologies GmbH, "Principles of Nulling and Imaging Ellipsometry," Technical Release Note, Oct. 2004. (4 pages).

Ringaby, "Geometric Models for Rolling-shutter and Push-broom Sensors," Dissertation No. 1615, Linköping University Institute of Technology, Aug. 2014. (55 pages).

\* cited by examiner

IMAGING ELLIPSOMETER SYSTEM UTILIZING A TUNABLE ACOUSTIC GRADIENT LENS

BACKGROUND

Technical Field

This disclosure relates to precision metrology and, more particularly, to the use of imaging ellipsometer systems for inspection and dimensional metrology.

Description of the Related Art

In ellipsometry, polarized light is shined at an angled surface, and the reflected light is analyzed to determine the magnitude and phase of light reflected by the two constituent, orthogonal polarizations (s- and p-). Since the surface reflectivity depends on polarization and angle (e.g., as indicated by Fresnel equations), the analyzed light can be used to determine the refractive index of the surface. In various implementations, by varying the light source wavelength, material dispersion can be derived. Or, if the surface is made up of a thin optical film, or a stack of films, a model can be used to determine the refractive indices and thicknesses of those layers. U.S. Pat. No. 5,754,296, which is hereby incorporated herein by reference in its entirety, discloses an ellipsometric microscope having high spatial resolution and thickness sensitivity for measuring the thickness of thin films (e.g., optical coatings, glass coatings, metal coatings, paints, lubricants, thin film surfaces of semiconductors, etc.)

In general, certain conventional ellipsometry systems use a sensitive detector and only measure reflection from a single point (i.e., the measurement is not spatially resolved). In contrast, certain other prior systems utilize imaging ellipsometery which may produce ellipsometric images from a surface in addition to determining film thickness and optical properties. U.S. Pat. No. 5,076,696, which is hereby incorporated herein by reference in its entirety, discloses a dynamic imaging microellipsometry system with a CCD camera utilized for full-field imaging for high resolution studies of thin-films. A publication available at https://www.accurion.com/imaging-ellipsometry/products/nanofilm_ep4/compendium_-—_principles_-imaging_ellipsometry.pdf, and entitled "Principles of Nulling and Imaging Ellipsometry" (hereinafter referenced as "Accurion Publication"), which is hereby incorporated herein by reference in its entirety, describes a system with a CCD detector that is utilized for imaging ellipsometery (e.g., utilizing a combination of nulling ellipsometery and microscopy) to provide 2D spatially-resolved ellipsometry measurements and high-resolution 2D images that can be overlapped with the ellipsometry data, and used for defect detection, etc.

As described in the Accurion Publication, one general issue with imaging ellipsometry is related to the inclined observation angle (i.e., the surface of the workpiece that is being inspected is at an angle relative to the CCD camera, for which different portions of the surface are at different focus distances relative to the camera). As a result, only a limited area of the image (e.g., a stripe of the image corresponding to the portion of the surface that is in focus) appears to be well-focused when using conventional optics. The described imaging ellipsometry system of the Accurion Publication overcomes this limitation by using a motorized focusing mechanism to collect a series of images with different foci within the field-of-view. A digital image processing system then superimposes only the focused parts of an image series, resulting in a digitized image that is generally in focus from edge to edge.

While imaging ellipsometer systems such as those described above are able to provide a digitized image that is in focus, the motorized focusing mechanism scanning techniques typically require a certain amount of time to be performed. For example, in various implementations, a typical scan may take 2-5 seconds. In addition, in certain instances the mechanical translation and altering of the relative positions of the components of the system (e.g., utilizing the motorized focusing mechanism) may have detrimental effects on repeatability and/or accuracy when used for acquiring inspection images (e.g., fixed focus inspection images) which are used for precision measurements (e.g., for accuracies on the order of a few micrometers) and the like.

Furthermore, in various implementations, in order to control the state of polarization incident on the workpiece being inspected, both a polarizer and a compensator may be placed on rotation stages and, in some modes of operation, an analyzer may be placed on a rotation stage as well, for which these stages are also typically motorized and add additional time to the measurement process. In addition, as described in the '296 patent, certain optical components, such as analyzers, may include unique defects which may only be determined by complex calibration procedures. As a result, rotation of the optical components may cause the path of the reflectance beam corresponding to a common position on the film sample surface to be altered with respect to different analyzer angles. Therefore, the reflectance beam represented by one analyzer angle may not strike the same point on the CCD camera as the reflectance beam represented by another analyzer angle. This effect is known as beam walking. Since the intensities of the phase shifted beams must add vectorially on a common pixel for accurate readings, beam walking may present a deficiency in the precision of ellipsometric systems.

An imaging ellipsometer system that can provide improvements with regard to such issues (e.g., for increasing the speed, reliability, repeatability, etc. of the measurement process) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A imaging ellipsometer system is provided including a lens configuration with tunable acoustic gradient index of refraction ("TAG") lens. The imaging ellipsometer system further includes a light source, a polarizer, a compensator, an analyzer and a camera. The light source (e.g., a laser) is configured to provide source light along an illumination path that is directed toward a workpiece. The polarizer is located along the illumination path and is configured to polarize the source light that is directed toward the workpiece, wherein the source light is reflected from the workpiece as workpiece light which travels along an imaging optical path. In various implementations, the compensator is located along at least one of the illumination path or the imaging optical path. The compensator is configured to elliptically polarize at least one of source light along the illumination path or workpiece light along the imaging optical path.

The lens configuration including the TAG lens is located along the imaging optical path. The TAG lens is controlled to provide a modulation of a focus position of the imaging ellipsometer system at or near a resonant frequency of operation of the TAG lens. The analyzer (e.g., a polarizer) is located along the imaging optical path (e.g., between the lens configuration and the camera). In various implementations, the analyzer comprises polarizers that are integrated onto an image sensor of the camera. The camera receives workpiece light that is transmitted along the imaging optical path through the TAG lens during an image exposure and provides a corresponding camera image. In various implementations, based at least in part on a characteristic of the workpiece light, a determination is made (e.g., as part of an ellipsometry analysis) of at least one of a refraction index or a thickness of one or more layers of the workpiece that are proximate to the surface of the workpiece. In various implementations, the determination (e.g., as part of the ellipsometry analysis) comprises utilizing an output from the camera that is indicative of features (e.g., magnitude and phase of light reflected by the two constituent, orthogonal polarizations (s- and p-)) of the workpiece light that has passed through the TAG lens and the analyzer.

DETAILED DESCRIPTION

Figure 1:
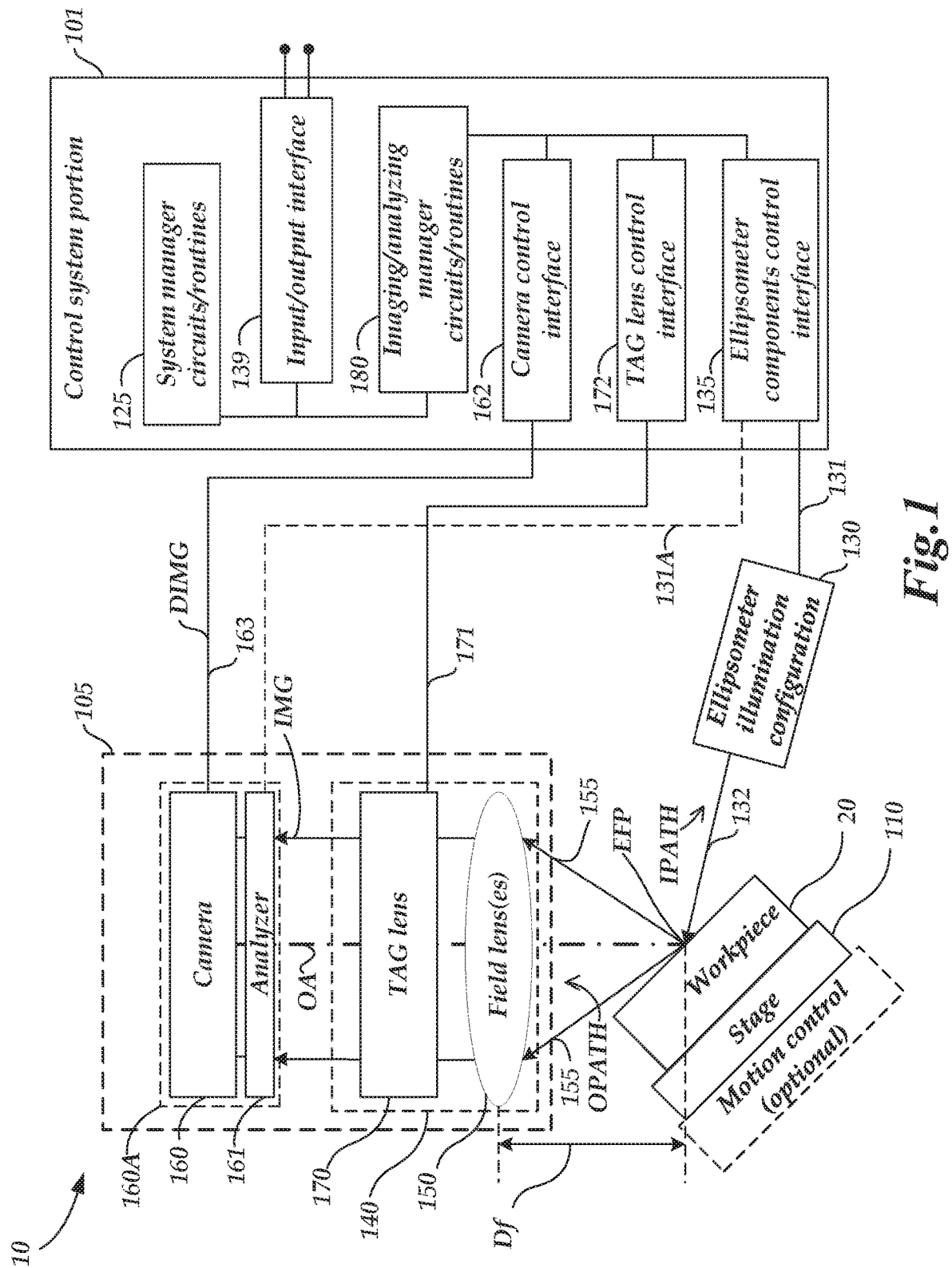
FIG. 1 is a block diagram of an optical imaging system portion and a control system portion of an imaging ellipsometer system including certain features disclosed herein.

FIG. 1 is a block diagram of an imaging ellipsometer system 10 including an optical imaging system 105, an ellipsometer illumination configuration 130, a workpiece stage 110 and a control system portion 101. In various implementations, the imaging ellipsometer system 10 may be adapted to a host system (e.g., machine vision), or used as a standalone system, and may be operated according to principles disclosed herein and in the incorporated references. The imaging ellipsometer system 10, including the optical imaging system 105, the ellipsometer illumination configuration 130, and the workpiece stage 110, may generally be controlled by the control system portion 101 to inspect and/or image a workpiece 20.

The optical imaging system 105 includes a camera 160, an analyzer 161 (e.g., comprising a polarizer), one or more field lenses 150 (e.g., including an interchangeable objective lens), and a tunable acoustic gradient ("TAG") lens 170. A brief background is described below regarding various operating principles and applications of the TAG lens 170 as used in the optical imaging system 105. To supplement this brief background with more in-depth explanation and understanding, various aspects of such operating principles and applications are also described in U.S. Pat. Nos. 9,930,243; 9,736,355; and 7,627,162, each of which is hereby incorporated herein by reference in its entirety.

In general, various types of multi-lens variable focal length optical systems (e.g., utilizing a TAG lens) such as that illustrated in FIG. 1 may be utilized for observation and precision measurement of surface heights, and may be included in a microscope and/or vision inspection system, for example as disclosed in U.S. Pat. No. 9,143,674, which is hereby incorporated herein by reference in its entirety. Briefly, a TAG lens is capable of acquiring multiple images at multiple focal lengths, respectively. A TAG lens creates a lensing effect using sound waves in a fluid medium. The sound waves may be created by application of an electrical field at or near a TAG lens resonant frequency to a vibrating member (e.g., a piezoelectric tube) surrounding the fluid medium to create a time-varying density and index of refraction profile in the lens's fluid, which modulates its optical power and thereby the focal length or effective focus position of the vision system. A TAG lens may be used to periodically modulate a focus position at or near a resonant frequency of up to several hundred kHz, i.e., at a high speed. Such a lens may be understood in greater detail by the teachings in the article, "High speed varifocal imaging with a tunable acoustic gradient index of refraction lens" (Optics Letters, Vol. 33, No. 18, Sep. 15, 2008), and in U.S. Pat. Nos. 8,194,307; 9,213,175; and 9,256,009, each of which is hereby incorporated herein by reference in its entirety. Tunable acoustic gradient index lenses and related controllable signal generators are available, for example, from TAG Optics, Inc., of Princeton, N.J.

One advantage of utilizing the TAG lens 170 in the imaging ellipsometer system 10 is that fast depth scanning may be achieved, and for which mechanical translation for altering of the relative positions of the components of the system may not be required. More specifically, as noted above, one general issue with imaging ellipsometry is related to the inclined observation angle (i.e., the surface of the workpiece 20 that is being inspected is at an angle relative to the image sensor of the camera 160, for which different portions of the surface of the workpiece 20 are at different focus distances relative to the camera). As a result, only a limited area of the image (e.g., a stripe of the image corresponding to the portion of the surface of the workpiece 20 that is in focus) appears to be well-focused when using conventional optics. Certain prior systems have utilized a motorized focusing mechanism to collect a series of images with different foci within the field-of-view, for which a digital image processing system is then utilized to superimpose the focused parts of an image series, resulting in a digitized image that is generally in focus from edge to edge.

One issue with the utilization of such motorized focusing mechanisms is that they may take various amounts of time (e.g., 2-5 seconds) for the scanning to complete. As will be described in more detail below, the TAG lens 170 enables such scanning to be performed much more quickly. In addition, the prior utilization of the motorized focusing mechanisms could, in some implementations, have detrimental effects on repeatability and/or accuracy when used for acquiring inspection images (e.g., fixed focus inspection images) which are used for precision measurements (e.g., for accuracies on the order of a few micrometers) and the like. The TAG lens 170 reduces or eliminates the need for such mechanical translation utilizing motorized mechanisms, which generally results in higher repeatability and accuracy.

As will be described in more detail below, in various implementations, certain scanning techniques may be utilized for the imaging ellipsometer system 10 including the TAG lens 170. For example, as noted above, the camera 160 may include an imaging array (e.g., a pixel array) that receives workpiece light 155 at an angle from the surface of the workpiece (i.e., in accordance with standard ellipsometery principles). In various implementations, the camera 160 may utilize an electronic rolling shutter for which each image of an image stack is a stripe of the pixel array of the camera 160. In such implementations, a control signal for the TAG lens (e.g., from the control system portion 101) may be synchronized with the electronic rolling shutter of the camera 160 such that the corresponding modulation of the focus position of the imaging ellipsometer system (i.e., as resulting from the operation of the TAG lens 170) results in each image of the image stack being at least approximately in focus. The general operations of the TAG lens 170 in the imaging ellipsometer system 10, and its control by the control system portion 101, will be described in more detail below.

As illustrated in FIG. 1, the control system portion 101 may include system manager circuits/routines 125, which may govern an input/output interface 139, and imaging/analyzing manager circuits/routines 180. A host system, or various individual display devices or input devices, or the like, may be connected to the input/output interface 139. In some implementations, the workpiece stage 110 may comprise an (optional) motion control system that moves the workpiece 20 relative to the optical imaging system 105. In such implementations, the system manager circuits/routines 125 may include a workpiece program generator and executor (not shown), that operates the motion control system and other features of the imaging ellipsometer system 10, to automatically inspect the workpiece 20, similar to certain techniques disclosed in the incorporated references.

As shown in FIG. 1, the imaging/analyzing manager circuits/routines 180 include or govern an ellipsometer components control interface 135, a camera control interface 162, and a TAG lens control interface 172. The TAG lens control interface 172 may include or be connected to a TAG lens controller (e.g., in a portion of the imaging/analyzing manager circuits/routines 180) including circuits and/or routines for controlling various image exposures synchronized with the periodic focus position modulation provided by the TAG lens 170. In some implementations, the TAG lens control interface 172 and a TAG lens controller may be merged and/or indistinguishable.

As will be described in more detail below with respect to FIGS. 2 and 3, in various implementations the ellipsometer components control interface 135 may control various components of the imaging ellipsometer system 10. For example, the ellipsometer components control interface 135 may control a light source of the ellipsometer illumination configuration 130, a rotating component (e.g., a rotating polarizer, a rotating analyzer, a rotating compensator), an electrically tunable waveplate, etc. As will be described in more detail below, in various implementations, the analyzer 161 may be a rotating polarizer that is controlled by the ellipsometer components control interface 135 (e.g., as indicated by an optional dotted-line control signal). In various alternative implementations, the ellipsometer components control interface 135 may control a rotating polarizer in the ellipsometer illumination configuration 130, a compensator (e.g., either rotating or as an electrically tunable waveplate), etc.

In various implementations, the ellipsometer components control interface 135 may work in conjunction with or may include an exposure time controller, or may otherwise provide strobe timing signals (e.g., to the ellipsometer illumination configuration 130), such that they provide an image exposure strobe timing that is synchronized with a desired phase timing of the TAG lens focus position modulation. In various implementations, the camera control interface 162 may control, for example, the camera configuration, exposure timing, analysis, and data output and the like, if applicable. In some implementations, the camera control interface 162 may include a timing controller such that the camera image exposure timing is synchronized with a desired phase timing of the TAG lens focus position modulation and/or an illumination timing. In various implementations, each of the above described controllable components of the imaging ellipsometer system 10, as well as the additional components described below, may be interconnected by one or more data/control buses and/or application programming interfaces, or by direct connections between the various elements.

As will be described in more detail below, an imaging optical path OPATH (e.g., along the optical axis OA) comprises various optical components that convey workpiece light 155 from the workpiece 20 to the camera 160. For example, the field lens 150, TAG lens 170 and camera 160 may all be arranged with their optical axes aligned on the same optical axis OA that intersects with the surface of the workpiece 20. However, it will be appreciated that this implementation is intended to be exemplary only, and not limiting. More generally, the imaging optical path OPATH may include mirrors and/or other optical elements, and may take any form that is operational for imaging the workpiece 20 using a camera (e.g., the camera 160) according to known principles. In the illustrated implementation, the imaging optical path OPATH includes the TAG lens 170, and may be utilized for imaging and/or measuring a surface of a workpiece 20 using one or more workpiece image exposures.

As previously outlined, the optical power of the TAG lens 170 changes continuously at a high frequency in response to a resonant or near resonant drive signal (e.g., as input on a signal line 171 from a TAG lens control interface 172 of the control system portion 101). The effective focus position EFP changes accordingly. In various implementations, the drive signal is a sinusoidal AC signal at or near a resonant frequency of operation of the TAG lens 170. A focal length Df corresponding to an effective focus position EFP is available at a correspond time or "phase timing" during the sinusoidally changing the optical power of the TAG lens 170. The nominal or "midrange" effective focus position may be considered to be the (fixed) focal length of the field lens 150 (e.g., an objective lens), in combination with the TAG lens in a state where its optical power is zero. The ellipsometer illumination configuration 130 or the camera 160 may be "strobed" at a particular phase or "phase timing" of the cycle to obtain an image exposure focused at a corresponding effective focus position or focus distance. Source light 132 is reflected as workpiece light 155, and the workpiece light used for imaging passes through the field lens 150 and the TAG lens 170 and is gathered by the camera 160. A workpiece image exposure which includes the image of the workpiece 20 is captured by the camera 160, and is output on a signal line 163 to the imaging/analyzing manager circuit/routines 180 (e.g., through a camera control interface 162). In various implementations, the camera 160 may be a known charge coupled device (CCD) image sensor or other form of image sensor, and may receive an incident image IMG and may output to the imaging/analyzing manager circuit/routines 180 a detected image DIMG having a predetermined signal form.

In various implementations, known contrast-based focus analysis methods may be used to analyze the resulting image(s) and determine whether they are in focus, and/or may be used in the system manager circuits and routines 125 or imaging manager circuits/routines 180 to adjust the strobe phase timing to provide an "autofocus" operation that provides a focused image of the workpiece 20. Alternatively, or in addition, such contrast-based focus analysis methods may be used to identify a best-focus image out of a set of images acquired at a corresponding set of known phase timings, and output that "best-focus" phase timing value. Z-height (effective focus position) calibration data may be utilized that relates respective Z-heights or effective focus positions to respective "best-focus" phase timings. Thus, the surface height coordinate of an imaged surface portion of a workpiece 20 may be determined based on the phase timing associated with its "best focus" image. Therefore, the optical imaging system 105 and/or the imaging/inspection system 10 may be used to measure or profile the workpiece 20 by scanning across it, if desired. Various aspects of such measuring processes are described in greater detail in the incorporated references.

As will be described in more detail below, in various implementations, images from the camera 160 may also or alternatively be utilized in combination with certain ellipsometry analysis processes. For example, an image may be overlapped with ellipsometry data (e.g., as used for defect detection, etc.). In various implementations, an ellipsometry analysis may include utilizing an output from the camera that is indicative of features (e.g., magnitude and phase of light reflected by the two constituent, orthogonal polarizations (s- and p-)) of the workpiece light (e.g., that has passed through the TAG lens 170 and the analyzer 161), and which is indicative of and utilized to determine a refraction index or a thickness of one or more layers of the workpiece, etc.

Figure 2:
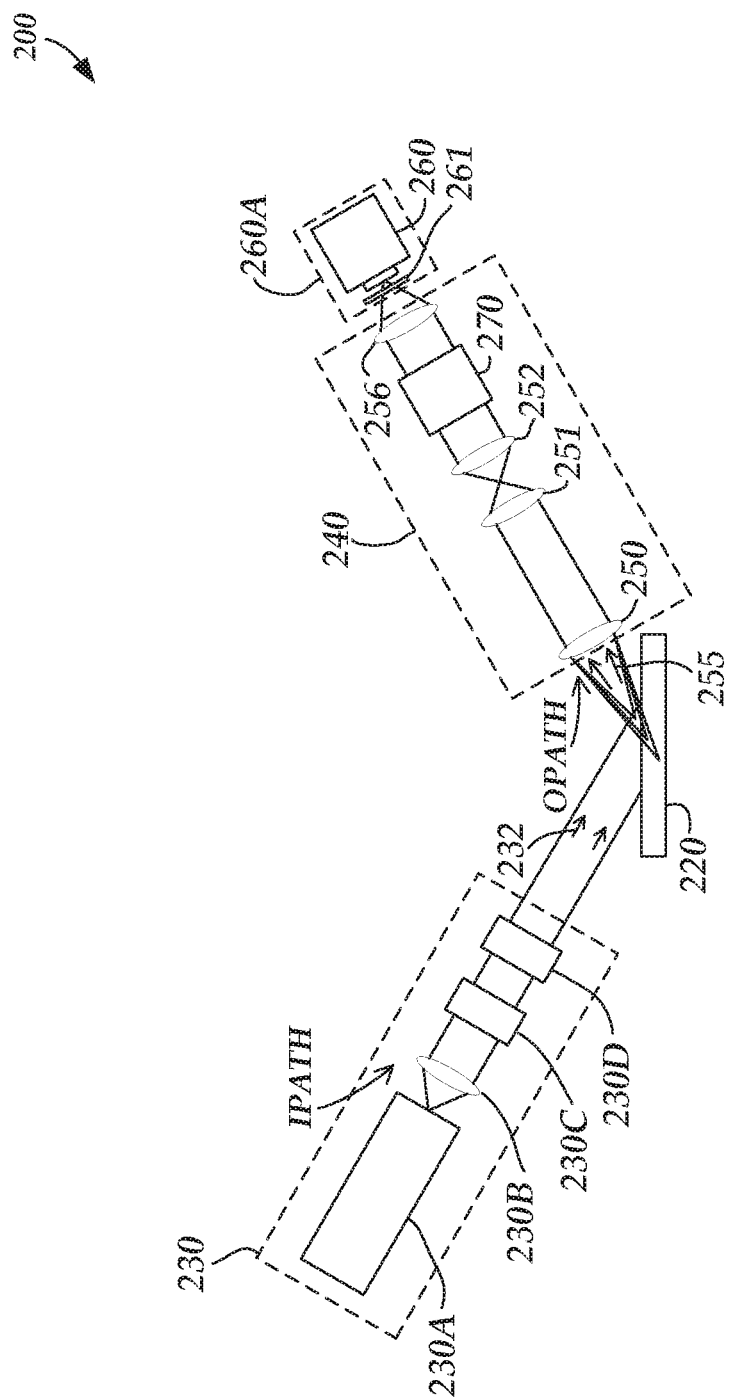
FIG. 2 is a block diagram of an ellipsometer illumination configuration and a lens configuration of an imaging ellipsometer system similar to that of FIG. 1.

FIG. 2 is a block diagram of an ellipsometer illumination configuration 230 and a lens configuration 240 of an imaging ellipsometer system 200 similar to that of FIG. 1. It will be appreciated that certain numbered components 2XX of FIG. 2 may correspond to and/or have similar operations as identically or similarly numbered counterpart components 1XX of FIG. 1, and may be understood by analogy thereto and as otherwise described below. This numbering scheme to indicate elements having analogous design and/or function is also applied to the following FIG. 3 (e.g., for components 3XX, etc.).

As shown in FIG. 2, the imaging ellipsometer system 200 includes an ellipsometer illumination configuration 230, a lens configuration 240, a camera 260 and an analyzer 261 (e.g., comprising a polarizer). As will be described in more detail below, in various implementations the camera 260 and the analyzer 261 may be included as part of an integrated analyzing camera configuration 260A (e.g., wherein the analyzer 261 may be integrated directly onto the image sensor of the camera 260). The ellipsometer illumination configuration 230 includes a light source 230A (e.g., a laser), a collimating lens 230B, a polarizer 230C and a compensator 230D, all of which are located along an illumination path IPATH which directs source light 232 toward a workpiece 220. The lens configuration 240 includes an objective lens 250, a tube lens 251, relay lenses 252 and 256, and the TAG lens 270, all of which (along with the analyzer 261 and camera 260) are located along an imaging optical path OPATH which directs the reflected workpiece light 255 from the workpiece 220 toward the camera 260.

In operation, the light source 230A provides source light 232 along the illumination path IPATH. The collimating lens 230B collimates the source light 232 which then passes through the polarizer 230C (e.g., a birefringent polarizer) that is configured to linearly polarize the source light 232. The source light 232 then passes through the compensator 230D (e.g., a quarter waveplate compensator), which elliptically polarizes the source light 232 by introducing a phase change between the constituent orthogonal polarizations (s- and p-), which then travels toward the workpiece 220. In various implementations, the workpiece 220 may be located (e.g., mounted) on a workpiece stage (e.g., workpiece stage 110 of FIG. 1) which may be adjustable (e.g., rotatable) and may be set for a specified angle of incidence (e.g., 70 degrees). In various implementations, the configuration may be arranged such that the illumination path IPATH and the imaging optical path OPATH each have an angle of incidence that is within a certain range (e.g., between 60 degrees and 80 degrees) relative to a normal vector from the planar surface of the workpiece.

The reflected workpiece light 255 travels along the imaging optical path OPATH and passes through the lens configuration 240, as will be described in more detail below with respect to FIG. 3. As noted above, the lens configuration 240 includes the TAG lens 270 that is controlled to provide a modulation of a focus position of the imaging ellipsometer system 200. The workpiece light 255 then travels through the analyzer 261 and forms an image on the camera 260. In accordance with such operations, the camera 260 receives the workpiece light 255 during an image exposure and provides a corresponding camera image. In various implementations, based at least in part on a characteristic of the workpiece light, a determination is made (e.g., as part of an ellipsometry analysis) of at least one of a refraction index or a thickness of one or more layers of the workpiece that are proximate to the surface of the workpiece 220 (e.g., semiconductor layers, dielectric layers, thin metal layers, etc.). In various implementations, the determination (e.g., as part of the ellipsometry analysis) comprises utilizing an output from the camera 260 that is indicative of features (e.g., magnitude and phase of light reflected by the two constituent, orthogonal polarizations (s- and p-)) of the workpiece light that has passed through the TAG lens 270 and the analyzer 261).

More specifically, in accordance with ellipsometry principles, as part of an ellipsometry analysis the polarized workpiece light 255 is analyzed (e.g., an output from the camera 260 that is indicative of the ellipsometric features of the workpiece light is analyzed) to determine the magnitude and phase of light reflected by the two constituent, orthogonal polarizations (s- and p-). Since the surface reflectivity depends on polarization and angle (e.g., as indicated by Fresnel equations), the analyzed light can be used to determine the refractive index (e.g., including real and imaginary parts) of the surface layer(s) of the workpiece 220. In various implementations, by varying the wavelength of the light source 230A, material dispersion of the workpiece 220 can be derived. Or, if the surface of the workpiece 220 is made up of a thin optical film, or a stack of films, or other thin layers, a model can be used to determine the refractive indices and thicknesses of those layers.

In various implementations, different types of ellipsometer configurations (e.g., rotating analyzer, rotating polarizer, rotating compensator, phase modulation, etc.) may be utilized for the imaging ellipsometer system 200. As an example of a rotating analyzer configuration, the analyzer 261 may be located on a 360 degree rotating stage. As an example of a rotating polarizer configuration, the polarizer 230C may be located on a 360 degree rotating stage, and for which the compensator 230D may instead be located along the imaging optical path OPATH before the lens configuration 240. As an example of a rotating compensator configuration, the compensator 230D may be located on a 360 degree rotating stage. As an example of a phase modulation configuration, the compensator 230D may be an electrically tunable waveplate, which may allow both the polarizer 230C and the analyzer 261 to remain fixed (e.g., non-rotated during operations).

In various implementations, the camera 260 and the analyzer 261 may be included as part of an integrated analyzing camera configuration 260A (e.g., wherein the analyzer 261 may be integrated directly onto the image sensor of the camera 260). As a specific example in which the camera 260 comprises the analyzer 261 (e.g., comprising polarizers), the Sony IMX250MZR camera includes polarizers integrated directly onto the image sensor. More specifically, each "pixel" of the pixel array is made up of four sub-pixels, and each of the four sub-pixels has an integrated polarizer oriented at a different angle (0°, 45°, 90°, 135°). The polarizers are "wire-grid" type, and use a 1-D array of metal wires to filter polarization. In such a configuration, light with the electric field perpendicular to the wires is transmitted and detected by the pixel, and light with the electrical field parallel to the wires is reflected and not detected. In use for conventional photography, such a configuration may be utilized to filter out unwanted light (e.g., reflections from water) to improve contrast. In accordance with principles disclosed herein, such a configuration may alternatively be utilized for determining the polarization state of incoming light to help analyze the optical properties of a reflecting surface of a workpiece (e.g., for determining refractive index, optical thickness, etc. as described above). Such a configuration may be utilized in place of an external fixed or rotating polarizer (e.g., the analyzer 261) in the imaging ellipsometry system 200.

Such implementations utilizing an integrated analyzing camera configuration may have various advantages. For example, as noted above, various components (e.g., the analyzer 261, polarizer 230C, etc.) may otherwise be located on motorized rotation stages, for which the mechanical operations for rotation may add time to the measurement process. In addition, as described in the '296 patent, since the intensities of the phase shifted beams must add vectorially on a common pixel for accurate readings, beam walking which may result from rotating components may present a deficiency in the precision of such ellipsometric systems. By utilizing an integrated analyzing camera configuration in accordance with principles disclosed herein, such issues may be avoided.

Figure 3:
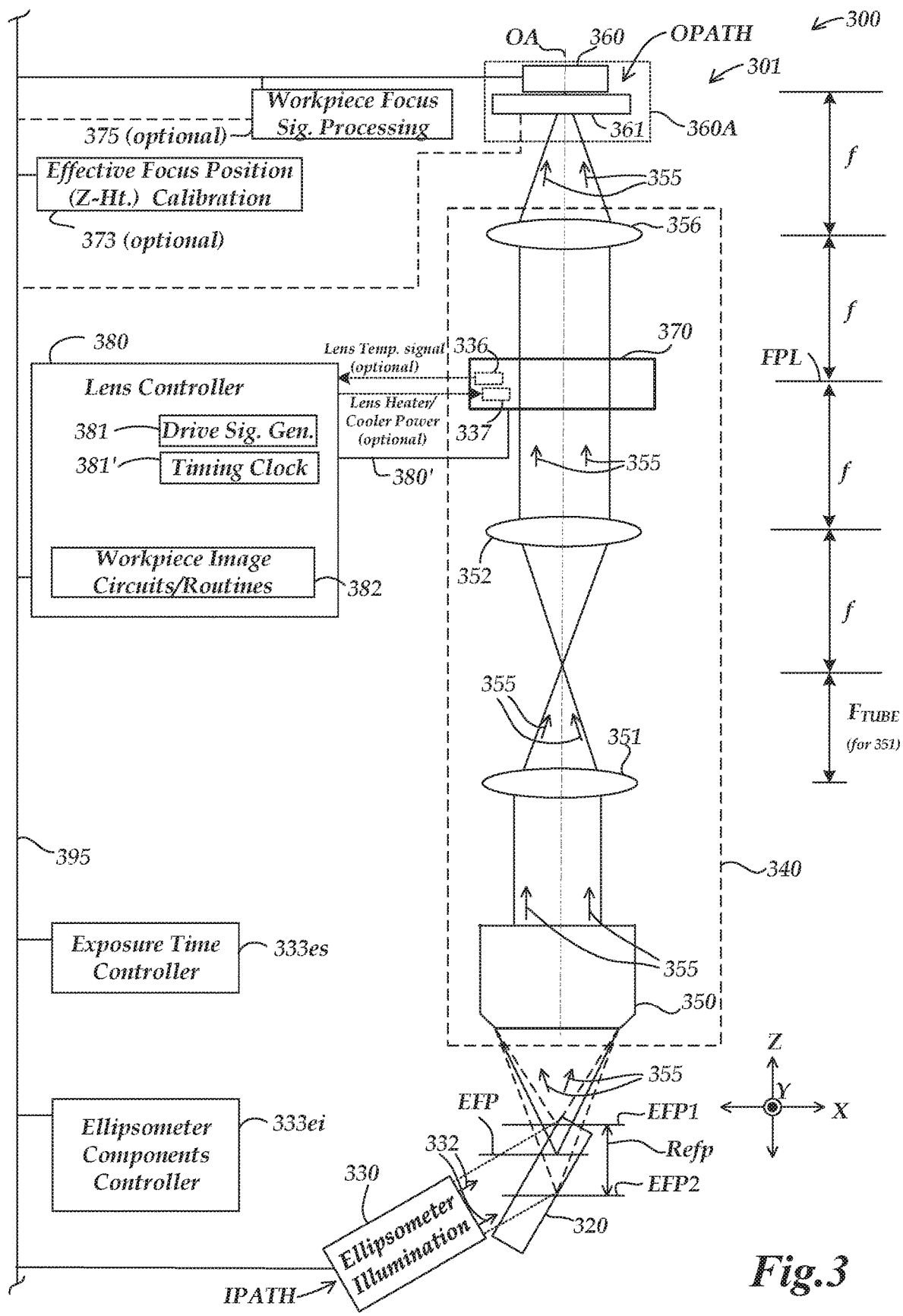
FIG. 3 is a schematic diagram of a lens configuration of an imaging ellipsometer system similar to that of FIG. 2.

FIG. 3 is a schematic diagram of a lens configuration 340 of an imaging ellipsometer system 300 similar to that of FIG. 2. As will be described in more detail below, an imaging optical path OPATH comprises various optical components that are arranged along a path that conveys workpiece light 355 from the workpiece 320 to the camera 360. The imaging light is generally conveyed along the direction of optical axes OA. In the implementation shown in FIG. 3, all of the optical axes OA are aligned. However, this implementation is intended to be exemplary only and not limiting. More generally, the imaging optical path OPATH may include mirrors and/or other optical elements, and may take any form that is operational for imaging the workpiece 320 using the camera 360 according to known principles. In the illustrated implementation, the imaging optical path OPATH includes the TAG lens 370 (which may be included in a 4f imaging configuration) and is utilized at least in part for imaging a surface of a workpiece 320 during a workpiece image exposure.

As shown in FIG. 3, the imaging ellipsometer system 300 includes an ellipsometer illumination configuration 330, a lens configuration 340 (i.e., including the TAG lens 370), a camera 360, an analyzer 361, an ellipsometer components controller 333$ei$, an exposure time controller 331$es$, an effective focus position (Z-height) calibration portion 373, a workpiece focus signal processing portion 375, and a lens controller 380. The lens configuration 340 includes an objective lens 350, a tube lens 351, a relay lens 352, the TAG lens 370, and a relay lens 356. In various implementations, various components of the imaging ellipsometer system 300 may be interconnected by direct connections or one or more data/control buses (e.g., a system signal and control bus 395) and/or application programming interfaces, etc.

In various implementations, the ellipsometer illumination configuration 330 may operate as described above with respect to FIGS. 1 and 2, for directing source light 332 along the illumination path IPATH toward the workpiece 320. As also described above, various components of the imaging ellipsometer system 300 (e.g., a light source of the ellipsometer illumination configuration 330, a rotating stage for various components such as the analyzer 361, a polarizer of the ellipsometer illumination configuration 330, etc.) may be controlled by an ellipsometer components controller 333$ei$. In operation, the objective lens 350 receives the reflected workpiece light 355 that is focused at an effective focus position EFP proximate to the surface of the workpiece 320, and outputs the workpiece light 355 to the tube lens 351. The tube lens 351 receives the workpiece light 355 and outputs it to the relay lens 352. In various implementations, the objective lens 350 may be an interchangeable objective lens and the tube lens 351 may be included as part of a turret lens assembly. In various implementations, any of the other lenses referenced herein may be formed from or operate in conjunction with individual lenses, compound lenses, etc.

The relay lens 352 receives the workpiece light 355 and outputs it to the TAG lens 370. The TAG lens 370 receives the workpiece light 355 and outputs it to the relay lens 356. The relay lens 356 receives the workpiece light 355 and outputs it to the camera 360. In various implementations, the camera 360 captures a camera image during an image exposure (e.g., during an integration period of the camera 360) also referred to as an image exposure period, and may provide the corresponding image data to a control system portion. A camera image may include a workpiece image (e.g., of a region of the workpiece 320) provided during a workpiece image exposure. In various implementations, the camera 360 may have a pixel array greater than 1 megapixel (e.g., 1.3 megapixel, with a 1280×1024 pixel array, with 5.3 microns per pixel).

In the example of FIG. 3, the relay lenses 352 and 356 and the TAG lens 370 are designated as being included in a 4f optical configuration, while the relay lens 352 and the tube lens 351 are designated as being included in a Keplerian telescope configuration, and the tube lens 351 and the objective lens 350 are designated as being included in a microscope configuration. All of the illustrated configurations will be understood to be exemplary only, and not limiting with respect to the present disclosure. In various implementations, the illustrated 4f optical configuration permits placing the TAG lens 370 (e.g., which may be a low numerical aperture (NA) device) at the Fourier plane of the objective lens 350. This configuration may maintain the telecentricity at the workpiece 320 and may minimize scale change and image distortion (e.g., including providing constant magnification for each Z-height of the workpiece 320 and/or effective focus position EFP). The Keplerian telescope configuration (e.g., including the tube lens 351 and the relay lens 352) may be included between the microscope configuration and the 4f optical configuration, and may be configured to provide a desired size of the projection of the objective lens clear aperture at the location of the TAG lens 370, so as to minimize image aberrations, etc.

In various implementations, the lens controller 380 may include a drive signal generator portion 381, a timing clock 381' and workpiece imaging circuits/routines 382. The drive signal generator portion 381 may operate (e.g., in conjunction with the timing clock 381') to provide a periodic drive signal to the high speed TAG lens 370 via a signal line 380' (e.g., to provide a nominally sinusoidal modulation of the focus position of the imaging ellipsometer system 300 at or near a resonant frequency of operation of the TAG lens). In various implementations, the imaging ellipsometer system 300 may comprise a control system (e.g., the control system portion 101 of FIG. 1) that includes or is otherwise configurable to operate in conjunction with the lens controller 380 for coordinated operations. In various implementations, the lens controller 380 may generally perform various functions related to imaging a workpiece 320 in a manner synchronized with a desired phase timing of the TAG lens 370, as well as controlling, monitoring and adjusting the driving and response of the TAG lens 370. In various implementations, the workpiece imaging circuits/routines 382 may perform standard workpiece imaging operations for the ellipsometer illumination configuration 330, synchronized with the phase timing of the TAG lens 370 as is known in the art and as described in certain of the incorporated references.

In various implementations, drift in the operating characteristics of the TAG lens 370 may arise due to unwanted temperature variations. As shown in FIG. 3, the imaging ellipsometer system 300 may optionally include a lens heater/cooler 337 associated with the TAG lens 370. The lens heater/cooler 337 may be configured to input an amount of heat energy into the TAG lens 370 and/or perform cooling functions to facilitate heating and/or cooling of the TAG lens 370 according to some implementations and/or operating conditions. In addition, in various implementations a TAG lens monitoring signal may be provided by a temperature sensor 336 associated with the TAG lens 370 to monitor an operating temperature of the TAG lens 370.

With respect to the general operations of the TAG lens 370, in various implementations as described above, the lens controller 380 may rapidly adjust or modulate its optical power periodically, to achieve a high-speed TAG lens capable of a periodic modulation (i.e., at or near a TAG lens resonant frequency) of 250 kHz, or 70 kHz, or 30 kHz, or the like. As shown in FIG. 3, by using the periodic modulation of a signal to drive the TAG lens 370, the effective focus position EFP of the imaging ellipsometer system 300 (that is, the focus position in front of the objective lens 350) may be (rapidly) moved within a range Refp (e.g., an autofocus search range). In general, the effective focus position EFP in front of the objective lens 350 during a workpiece image exposure corresponds to the optical power of the TAG lens 370 during that workpiece image exposure. The range Refp may be bound by an effective focus position EFP1 (or EFPmax) corresponding to a maximum optical power of the TAG lens 370 in combination with the objective lens 350, and an effective focus position EFP2 (or EFPmin) corresponding to a maximum negative optical power of the TAG lens 370 in combination with the objective lens 350. In various implementations, the effective focus positions EFP1 and EFP2 may approximately correspond to phase timings of 90 degrees and 270 degrees, respectively. In various implementations, the middle of the range Refp may be designated as EFPnom, and may correspond to zero optical power of the TAG lens 370 in combination with the nominal optical power of the objective lens 350. According to this description, EFPnom may approximately correspond to the nominal focal length of the objective lens 350 in some implementations.

In various embodiments, the TAG lens 370 and corresponding range Refp is advantageously chosen such that the configuration limits or eliminates the need for macroscopic mechanical adjustments of the imaging system and/or adjustment of the distance between the objective lens 350 and the workpiece 320 in order to change the effective focus position EFP. For example, the range Refp may be chosen to be able to scan a desired portion or all of the focus distances of the tilted/angled surface of the workpiece 320. In such implementations, images (e.g., individual images and/or images of an image stack or extended depth of field "EDOF" images) may be provided at a high rate. Furthermore, there may be no need for utilizing macroscopic adjustment elements nor associated positioning non-repeatability to degrade accuracy when the imaging system is used for acquiring inspection images of the workpiece surface (e.g., fixed focus inspection images) which are used for precision measurements (e.g., for accuracies on the order of a few micrometers) and the like.

In one implementation, the optional workpiece focus signal processing portion 375 may input data from the camera 360 and may provide data or signals that are utilized to determine when an imaged surface region (e.g., of the workpiece 320) is at an effective focus position in an image. For example, a group of images acquired by the camera 360 at different Z-heights (e.g., an image stack), may be analyzed using a known "maximum contrast" or "best-focus image" analysis to determine if or when an imaged surface region of the workpiece 320 is at a corresponding effective focus position in an image. However, more generally, any other suitable known image focus detection configuration may be used. In any case, the workpiece focus signal processing portion 375 or the like may input an image or images acquired during the periodic modulation of the effective focus position (sweeping of multiple effective focus positions) of the TAG lens 370, and determine an image wherein a target feature is best-focused. In some implementations, the workpiece focus signal processing portion 375 may further determine the known phase timing corresponding to that best-focus image and output that "best-focus" phase timing value to the effective focus position calibration portion 373. The effective focus position calibration portion 373 may provide Z-height (effective focus position) calibration data that relates respective Z-heights or effective focus positions to respective "best-focus" phase timings within a period of a standard imaging frequency of the TAG lens 370, wherein the calibration data corresponds to operating the TAG lens 370 according to a standard imaging drive control configuration or reference state.

Generally speaking, the effective focus position calibration portion 373 comprises recorded Z-height (or effective focus position) calibration data. As such, its representation in FIG. 3 as a separate element is intended to be a schematic representation only, and not limiting. In various implementations, the associated recorded Z-height calibration data may be merged with and/or indistinguishable from the lens controller 380, the workpiece focus signal processing portion 375, or a host computer system connected to the system signal and control bus 395, etc.

In various implementations, the exposure time controller 333es controls (e.g., by providing timing signals and/or control signals, etc.) an exposure timing and duration that governs an image exposure of the imaging ellipsometer system 300 (e.g., relative to a phase timing of the periodically modulated effective focus position). For example, in some implementations, during an image exposure the exposure time controller 333es (e.g., using the Z-height calibration data available in the effective focus position calibration portion 373), may control the ellipsometer illumination configuration 330 to strobe at a respective controlled time. For example, the exposure time controller 333es may control the light source (e.g., a pulsed laser) of the ellipsometer illumination configuration 330 to strobe at a respective phase timing within a period of an imaging frequency of the TAG lens 370, so as to acquire an image having a particular effective focus position within the sweeping (periodic modulation) range of the TAG lens 370. In other implementations, the exposure time controller 333es may control a fast electronic camera shutter of the camera 360 to acquire an image at a respective controlled time and/or its associated effective focus position. In various implementations, in conjunction with a standard ellipsometry configuration with a tilted/angled surface of a workpiece, the exposure time controller 333es may control an electronic rolling shutter for which each image of an image stack is a stripe of the pixel array of the camera 360 and such that each image of the image stack is at least approximately in focus. In some implementations, the exposure time controller 333es may be merged with or indistinguishable from the camera 360.

In general, in various implementations, the timing between the focus of the TAG lens 370 and the imaging system may be provided by the timing of the control of the light source of the ellipsometer illumination configuration 330. The light source (e.g., a laser source) may be pulsed/strobed, and the timing of the pulses/strobing may provide precise control over which phase of the TAG lens waveform corresponds to the image exposure. In various implementations, such a configuration may be utilized (e.g., as an alternative to a rolling shutter configuration), where different areas of multiple images are spliced together to form an all in-focus image. Alternatively, such a configuration may be utilized in combination with a rolling shutter configuration to provide more precise time-gating, etc.

Figure 4:
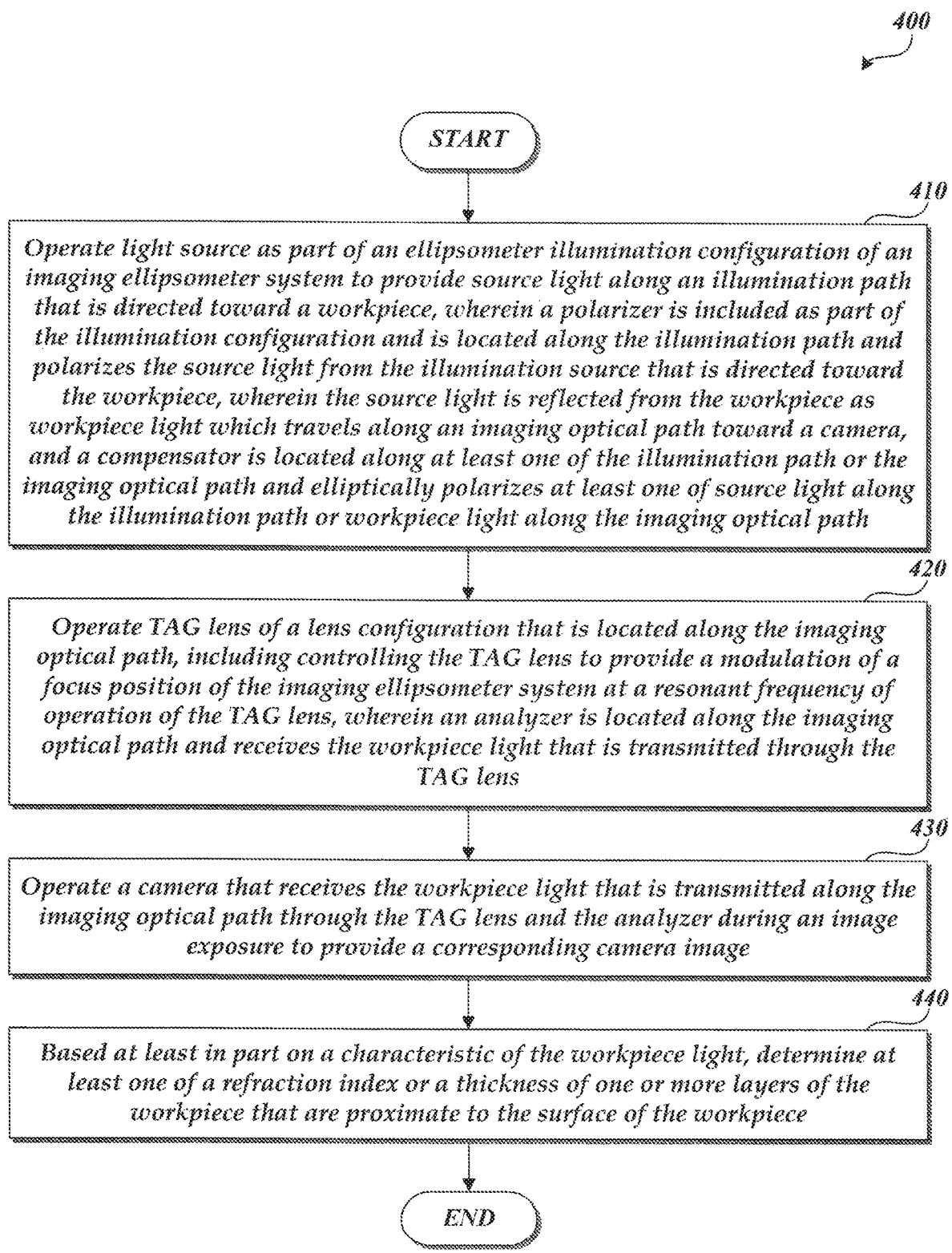
FIG. 4 is a flow diagram illustrating one exemplary implementation of a routine for operating an imaging ellipsometer system according to principles disclosed herein.

FIG. 4 is a flow diagram illustrating one exemplary implementation of a routine 400 for operating an imaging ellipsometer system according to principles disclosed herein. At a block 410, a light source is operated as part of an ellipsometer illumination configuration of an imaging ellipsometer system to provide source light along an illumination path that is directed toward a workpiece. A polarizer is included as part of the illumination configuration and is located along the illumination path and polarizes the source light from the illumination source that is directed toward the workpiece. The source light is reflected from the workpiece as workpiece light which travels along an imaging optical path toward a camera. A compensator is located along at least one of the illumination path or the imaging optical path and elliptically polarizes at least one of source light along the illumination path or workpiece light along the imaging optical path.

At a block 420, a TAG lens of a lens configuration that is located along the imaging optical path is operated, including controlling the TAG lens to provide a modulation of a focus position of the imaging ellipsometer system at or near a resonant frequency of operation of the TAG lens. An analyzer is located along the imaging optical path and receives the workpiece light that is transmitted through the TAG lens. At a block 430, a camera is operated that receives the workpiece light that is transmitted along the imaging optical path through the TAG lens and the analyzer during an image exposure to provide a corresponding camera image. At a block 440, at least one of a refraction index or a thickness of one or more layers of the workpiece that are proximate to the surface of the workpiece is determined based at least in part on a characteristic of the workpiece light. In various implementations, the determination comprises utilizing an output from the camera that is indicative of features of the workpiece light that has passed through the TAG lens and the analyzer. In various implementations, the analyzer comprises polarizers that are integrated onto an image sensor of the camera.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:
1. An imaging ellipsometer system, comprising:
   a light source configured to provide source light along an illumination path that is directed toward a workpiece;
   a polarizer located along the illumination path that is configured to polarize the source light that is directed toward the workpiece, wherein the source light is reflected from the workpiece as workpiece light which travels along an imaging optical path;
   a compensator located along at least one of the illumination path or the imaging optical path and that is configured to elliptically polarize at least one of source light along the illumination path or workpiece light along the imaging optical path;
   a lens configuration that is located along the imaging optical path, the lens configuration comprising:
      a tunable acoustic gradient index of refraction ("TAG") lens that is controlled to provide a modulation of a focus position of the imaging ellipsometer system at or near a resonant frequency of operation of the TAG lens; and
      an objective lens that inputs workpiece light that is reflected from the workpiece and transmits the workpiece light along the imaging optical path through the TAG lens;
   a camera that receives workpiece light that is transmitted along the imaging optical path through the objective lens and the TAG lens during an image exposure and provides a corresponding camera image, the camera comprising an analyzer and an image sensor, wherein the analyzer comprises a plurality of polarizers that are oriented at different angles and are integrated onto the image sensor; and a control system configured to:
operate the camera and the TAG lens to obtain an image stack comprising a plurality of camera images of the workpiece that are each focused at a different Z-height in accordance with the modulation of the focus position of the TAG lens, and for each image of the image stack the objective lens is maintained at a fixed distance from the workpiece such that no mechanical adjustments of the distance between the objective lens and the workpiece are made during the acquisition of the image stack; and perform an ellipsometry analysis process based at least in part on a characteristic of the workpiece light, the ellipsometry analysis process comprising determining at least one of a refraction index or a thickness of one or more layers of the workpiece that are proximate to the surface of the workpiece, wherein the different angles of orientation of the polarizers that are integrated onto the image sensor of the camera enable the ellipsometry analysis process to be performed without mechanical rotation of the analyzer.

2. The imaging ellipsometer system of claim 1, wherein the plurality of polarizers that are oriented at different angles comprise polarizers that are oriented at 0 degrees, 45 degrees, 90 degrees and 135 degrees.

3. The imaging ellipsometer system of claim 1, wherein the compensator is a quarter waveplate compensator.

4. The imaging ellipsometer system of claim 1, further comprising a collimating lens located along the illumination path which collimates the source light from the light source.

5. The imaging ellipsometer system of claim 1, wherein an effective focus position in front of the objective lens during a workpiece image exposure corresponds to an optical power of the TAG lens during that workpiece image exposure.

6. The imaging ellipsometer system of claim 1, wherein the lens configuration further comprises a tube lens and a relay lens that are located along the imaging optical path between the objective lens and the TAG lens, wherein the workpiece light that is transmitted by the objective lens along the imaging optical path is received by the tube lens and is output by the tube lens to the relay lens which in turn outputs the workpiece light to the TAG lens.

7. The imaging ellipsometer system of claim 6, wherein the relay lens and the tube lens are included in a Keplerian telescope configuration, and the tube lens and the objective lens are included in a microscope configuration.

8. The imaging ellipsometer system of claim 1, wherein the illumination path and the imaging optical path are not normal to a planar surface of the workpiece.

9. The imaging ellipsometer system of claim 8, wherein the illumination path and the imaging optical path each have an angle of incidence that is between 60 degrees and 80 degrees relative to a normal vector from the planar surface of the workpiece.

10. The imaging ellipsometer system of claim 1, wherein the camera includes a pixel array that receives the workpiece light at an angle from the workpiece and utilizes an electronic rolling shutter for which each image of an image stack is a stripe of the pixel array of the camera, and for which a control signal for the TAG lens is synchronized with the electronic rolling shutter such that the corresponding modulation of the focus position of the imaging ellipsometer system results in each image of the image stack being at least approximately in focus.

11. The imaging ellipsometer system of claim 1, wherein the image sensor comprises a pixel array and the analyzer which is not mechanically rotated is configured to enable intensities of phase shifted beams of the workpiece light to add vectorially on a common pixel of the pixel array such that beam walking does not occur.

12. A computer implemented method for operating an imaging ellipsometer system, the computer implemented method comprising:
under control of one or more computing systems configured with executable instructions,
operating a light source as part of an ellipsometer illumination configuration of an imaging ellipsometer system to provide source light along an illumination path that is directed toward a workpiece, wherein a polarizer is included as part of the illumination configuration and is located along the illumination path and polarizes the source light from the illumination source that is directed toward the workpiece, wherein the source light is reflected from the workpiece as workpiece light which travels along an imaging optical path toward a camera, and a compensator is located along at least one of the illumination path or the imaging optical path and elliptically polarizes at least one of source light along the illumination path or workpiece light along the imaging optical path;

operating a tunable acoustic gradient index of refraction ("TAG") lens of a lens configuration that is located along the imaging optical path, including controlling the TAG lens to provide a modulation of a focus position of the imaging ellipsometer system at or near a resonant frequency of operation of the TAG lens, wherein an analyzer is located along the imaging optical path and receives the workpiece light that is transmitted through the TAG lens, and the lens configuration also includes an objective lens that inputs workpiece light that is reflected from the workpiece and transmits the workpiece light along the imaging optical path through the TAG lens;

operating a camera that receives the workpiece light that is transmitted along the imaging optical path through the objective lens and the TAG lens during a plurality of image exposures to provide a plurality of corresponding camera images as part of an image stack, wherein each image of the image stack is focused at a different Z-height in accordance with the modulation of the focus position of the TAG lens, and for each image of the image stack the objective lens is maintained at a fixed distance from the workpiece such that no mechanical adjustments of the distance between the objective lens and the workpiece are made during the acquisition of the image stack; and perform an ellipsometry analysis process based at least in part on a characteristic of the workpiece light, the ellipsometry analysis process comprising determining at least one of a refraction index or a thickness of one or more layers of the workpiece that are proximate to the surface of the workpiece, wherein the camera comprises an analyzer and an image sensor, and the analyzer comprises a plurality of polarizers that are oriented at different angles and are integrated onto the image sensor, and the different angles of orientation of the polarizers enable the ellipsometry analysis process to be performed without mechanical rotation of the analyzer.

13. The computer implemented method of claim 12, wherein the plurality of polarizers that are oriented at different angles comprise polarizers that are oriented at 0 degrees, 45 degrees, 90 degrees and 135 degrees.

14. The computer implemented method of claim 12, wherein the compensator is a quarter waveplate compensator.

15. The computer implemented method of claim 12, wherein the ellipsometer illumination configuration further includes a collimating lens located along the illumination path which collimates the source light from the light source.

16. An imaging ellipsometer system, comprising:
 a lens configuration that is located along an imaging optical path, wherein the lens configuration is configured to receive workpiece light that is reflected from a workpiece, for which the workpiece light corresponds to reflected source light that is provided along an illumination path toward the workpiece by an ellipsometer illumination configuration, the lens configuration comprising:
  an objective lens that inputs workpiece light that is reflected from the workpiece and transmits the workpiece light along the imaging optical path; and
  a tunable acoustic gradient index of refraction ("TAG") lens that is located along the imaging optical path and is controlled to provide a modulation of a focus position of the imaging ellipsometer system;
 a camera that receives workpiece light that is transmitted along the imaging optical path through the objective lens and the TAG lens during an image exposure and provides a corresponding camera image, the camera comprising an analyzer and an image sensor, wherein the analyzer comprises a plurality of polarizers that are oriented at different angles and are integrated onto the image sensor; and
 a control system configured to:
  operate the camera and the TAG lens to obtain an image stack comprising a plurality of camera images of the workpiece that are each focused at a different Z-height in accordance with the modulation of the focus position of the TAG lens, and for each image of the image stack the objective lens is maintained at a fixed distance from the workpiece such that no mechanical adjustments of the distance between the objective lens and the workpiece are made during the acquisition of the image stack; and
  perform an ellipsometry analysis process based at least in part on a characteristic of the workpiece light, the ellipsometry analysis process comprising determining at least one of a refraction index or a thickness of one or more layers of the workpiece that are proximate to the surface of the workpiece, wherein the different angles of orientation of the polarizers that are integrated onto the image sensor of the camera enable the ellipsometry analysis process to be performed without mechanical rotation of the analyzer.

17. The imaging ellipsometer system of claim 16, wherein the plurality of polarizers that are oriented at different angles comprise polarizers that are oriented at 0 degrees, 45 degrees, 90 degrees and 135 degrees.

18. The imaging ellipsometer system of claim 16, wherein the compensator is a quarter waveplate compensator.

19. The imaging ellipsometer system of claim 16, further comprising a collimating lens located along the illumination path which collimates the source light from the light source.

20. The imaging ellipsometer system of claim 16, wherein the image sensor comprises a pixel array and the analyzer which is not mechanically rotated is configured to enable intensities of phase shifted beams of the workpiece light to add vectorially on a common pixel of the pixel array such that beam walking does not occur.

\* \* \* \* \*